Patented Jan. 26, 1943

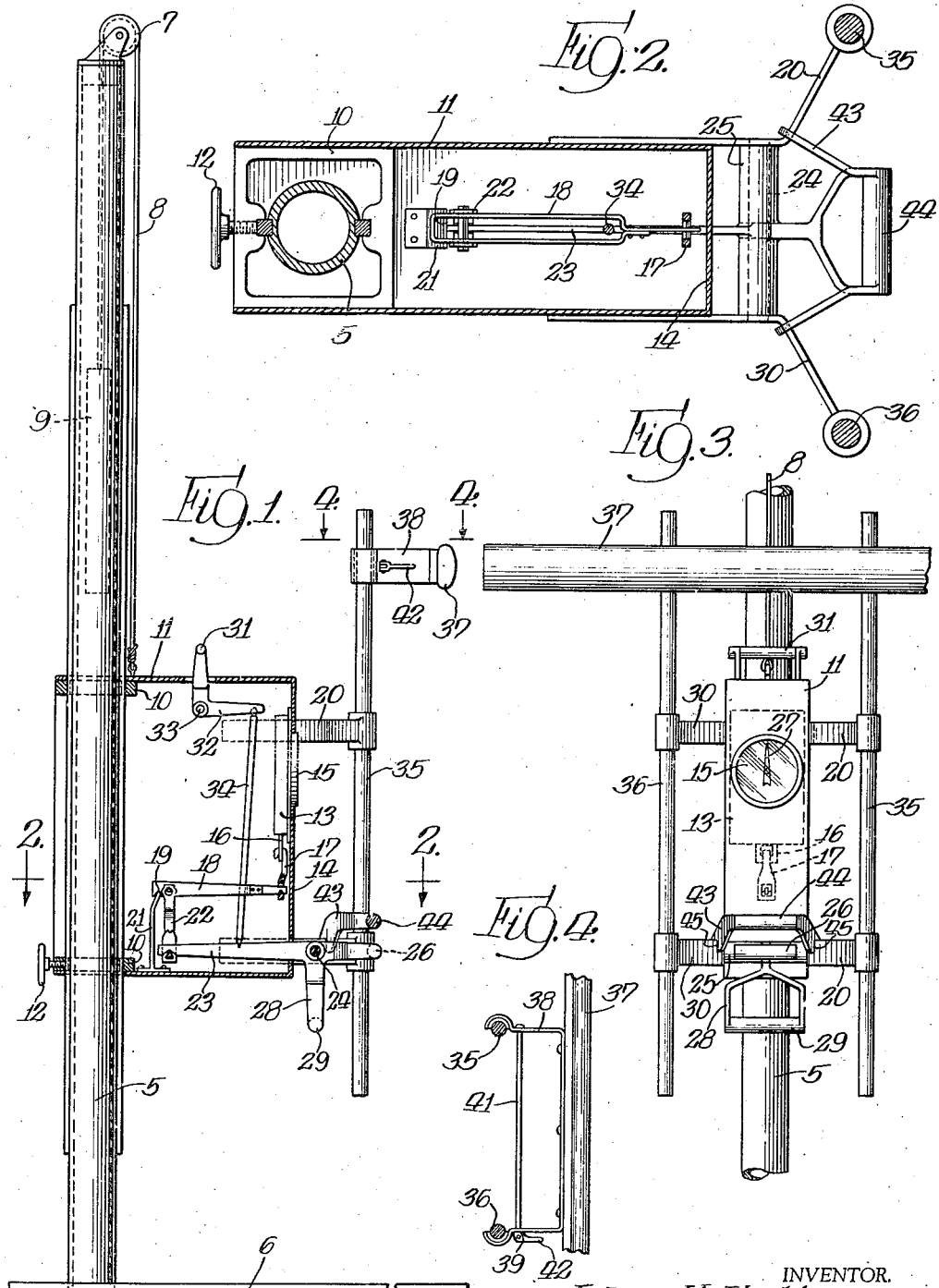

2,309,511

UNITED STATES PATENT OFFICE 2,309,511

MUSCLE DYNAMOMETER

John H. Kellogg, Battle Creek, Mich., assignor to The Race Betterment Foundation, Battle Creek, Mich., a corporation of Michigan Application December 12, 1940, Serial No. 369,723

3 Claims. (Cl. 265—20)

This invention relates in general to testing apparatus and more particularly to an apparatus known as a muscle dynamometer by which the strength of different groups of muscles in the human body may be tested.

In many apparently normal and healthy individuals one or more groups of muscles are under-developed or weak in comparison with the other muscles of the body. By testing the various groups of muscles of a large number of individuals, the relative strengths of the various groups and the actual strength of the various muscles in individuals of various sizes may be ascertained. From the data thus obtained, the average strength of each group of muscles of individuals of different sizes may be determined. By ascertaining through suitable testing the strength of the various groups of muscles of an individual and comparing those strengths with the average strength of individuals of a corresponding size, those groups of muscles of the individual tested which are underdeveloped may be readily singled out. Forms of exercise for developing and strengthening those weaker muscles may then be prescribed so as to normalize the muscular strength of such individual. This practice is followed to a large extent in the army and navy, and in other institutions where muscular strength and symmetry of muscle development is recognized as important.

The purpose of my present invention is to provide a novel, convenient, reliable and durable dynamometer by which the strength of the various groups of muscles of an individual may be readily and accurately determined.

With this end in view, my machine is designed to provide an adjustable housing equipped with various force-receiving elements located in accessible positions to which the force of various muscles of the body may be applied, the machine being compact and sturdy and provided with an indicator so connected with the various elements that the muscular force exerted will be shown by the indicator.

For the purpose of exemplifying the principles involved in my invention, a preferred embodiment of the invention is illustrated in the accompanying drawing from which, in conjunction with the following description, the principles of operation involved should be readily understood.

Referring to the drawing:

Fig. 1 is a vertical sectional view through a machine constructed in accordance with my invention;

Fig. 2 is a horizontal sectional view on the line 2—2 of Fig. 1;

Fig. 3 is a fragmentary front elevation looking toward the left of Fig. 1; and

Fig. 4 is a fragmentary section on the line 4—4 of Fig. 1.

Referring to the drawing more in detail, reference character 5 indicates a hollow tubular standard rising from a suitable base 6 and provided at its upper end with a pulley 7 over which is trained a cable 8 connected at one end to a counterweight 9 adapted to move vertically in the standard and connected at its other end to a housing 11 equipped with upper and lower reinforcing blocks 10 splined for vertical movement on the standard and adapted to be locked in adjusted position by a lock screw 12 or other suitable holding device.

A spring scale 13 is mounted on the inner face of the front wall 14 of the housing, with the dial 15 of the scale disposed in visible position through an opening in said wall. The actuating member 16 of the scale is connected by a link 17 with a lever 18 fulcrumed at 19 upon the upper end of a supporting member 21. This lever is connected near the fulcrum by a link 22 with a lever 23 fulcrumed outside of the housing upon a rod 24 extending between the two bracket members 20 and 30 which are bolted or otherwise securely fastened to the side walls of the housing 11. The strap members of these brackets may, if preferred, be extended to brace the side walls and rear wall of the housing 11 for strengthening purposes.

In order to afford a substantial and durable fulcrum for the lever 23, the lever is provided with an elongated bearing sleeve 25, best shown in Fig. 2, through which the fulcrum rod 24 extends from end to end, thereby providing a large bearing surface which obviates twisting or turning movements of the lever under the influence of force exerted thereon. The outer end of this lever is bifurcated and equipped with a handle 26 providing a force-receiving element upon which muscular force may be exerted by the individual being tested.

This element is particularly adapted to receive an upward pull which will rock the lever 23 in a counter-clockwise direction upon its fulcrum 24, thereby causing the degree of pull or force exerted to be indicated by the pointer 27 upon the dial 15.

For the purpose of receiving a horizontal pull which will be indicated on the dial in the same manner, the lever 23 is also formed to provide a bifurcated downward extension 28 carrying a similar handle of force-receiving element 29. An outward pull, that is, to the right viewing Fig. 1, exerted upon the element 29 will rock the lever 23 to cause the indication by the pointer 27 of the degree of pull or force exerted.

For testing other groups of muscles, such as the neck and back muscles for instance, another force-receiving element 31 located above the top of the housing 11 is carried by a bell crank lever 32 fulcrumed at 33 in the housing, the horizontal arm of said bell crank lever being connected with the lever 23 by a link or thrust rod 34 so that force exerted to the right viewing Fig. 1 upon the element 31 will be transmitted to the lever 23 and thence to the indicator in the manner previously explained. When using the element 31, a strap or band extending forwardly from this element and around the neck, body, arm, or other portion of the individual being tested may be employed.

In order to afford an anchorage against which the person being tested may brace himself when exerting horizontal pulling efforts, the brackets 20 at one side of the machine carry a vertically extending bracing bar 35, and the brackets 30 at the opposite side carry a similar bracing bar 36. As a further provision for bracing purposes, I have provided a horizontal, padded bracing bar 37 mounted on a U-shaped metal yoke 38, the legs of which are shaped to embrace the vertical bars 35 and 36 against which they are clamped. To hold the bar 37 in vertically adjusted position I provide a cam member 39 pivoted on one end of a tie rod 41 extending between the legs of the yoke 38. A handle 42 on the cam member 39 may be manipulated to loosen the rod 41 so as to permit vertical adjustment of the brace bar 37 and to draw the legs of the yoke together into clamping relation with the bars 35 and 36 to hold the brace bar into vertically adjusted position. This provision for adjustment of the horizontal brace bar together with the capability of vertical adjustment of the apparatus as a whole upon the standard 5 enables the apparatus to be adjusted for individuals of various sizes and for the requirements of various tests to be made.

For the purpose of enabling the apparatus to be used for testing the hand and forearm muscles employed in grasping or gripping, I have provided an attachment in the form of a U-shaped member 43 including an element in the form of a transverse handle 44. The free ends of the member are provided with downwardly opening slots 45 adapted to be engaged with the outwardly extending portions of the lower brackets 20 and 30, as illustrated in Figs. 1, 2 and 3. When this device is to be used, it is placed in the position shown so that the elements 44 and 26 may be simultaneously grasped in one's hand, and since the element 44 is stationary, the gripping force exerted will pull the element 26 upwardly, thereby actuating the lever 23 to cause the indication of the gripping force upon the dial 15.

When the member 43 is not required, it may be detached by simply lifting it upwardly to disengage the slots from the brackets.

It should be apparent from the foregoing that I have provided a compactly arranged muscle dynamometer providing various force-receiving elements disposed in accessible position, together with suitable bracing members against which the individual being tested may brace himself during the various tests. The apparatus as a whole and the horizontal brace bar are capable of vertical adjustment, and the force exerted upon the various force-receiving elements whether exerted horizontally or vertically is transmitted to and shown by the indicator. The apparatus is therefore capable of use in testing the various groups of muscles in the human body and is substantial and durable so as to accurately indicate the forces exerted upon it regardless of the hard usage to which it is subjected.

The structural details illustrated and described are obviously capable of considerable modification without departing from the scope of my invention as defined in the following claims.

I claim:

1. A muscle dynamometer comprising a standard, a vertically adjustable housing mounted on said standard, a pair of vertical brace bars located forwardly of said housing, a transverse brace bar vertically adjustable on said vertical brace bars, a force-receiving element carried by said housing and located in proximity to said brace bars, an indicator mounted on the housing and adapted to yieldingly resist the force applied, and means for transmitting the applied force from said element to said indicator.

2. A muscle dynamometer comprising a vertical standard, a housing vertically adjustable on said standard, a plurality of force-receiving elements carried by the housing, an indicator supported by the housing and adapted to yieldingly resist the applied force, means interposed between said elements and said indicator for transmitting to said indicator the force applied to said elements, a pair of vertical brace bars carried by the housing adjacent the force receiving elements, a horizontal brace bar, and means for clamping said horizontal brace bar in selected horizontal positions on said vertical brace bars.

3. A muscle dynamometer comprising a standard, a housing vertically adjustable thereon, means for locking the housing in adjusted position, an indicator on the housing constructed to yiledably resist the applied force, brackets extending forwardly from the housing, vertical brace bars carried by said brackets, a horizontal brace bar adjustably mounted on said vertical brace bars, a force receiving element supported on said housing in proximity to said brace bars, and mechanism connecting said element to said indicator through which force applied to said element is transmitted to the indicator.

JOHN H. KELLOGG.